US007767960B2

(12) United States Patent
Makarov

(10) Patent No.: US 7,767,960 B2
(45) Date of Patent: Aug. 3, 2010

(54) MULTI-ELECTRODE ION TRAP

(75) Inventor: Alexander Alekseevich Makarov, Cheshire (GB)

(73) Assignee: Thermo Finnigan LLC, San Jose, CA (US)

( * ) Notice: Subject to any disclaimer, the term of this patent is extended or adjusted under 35 U.S.C. 154(b) by 290 days.

(21) Appl. No.: 11/994,095

(22) PCT Filed: Jun. 27, 2006

(86) PCT No.: PCT/GB2006/002361

§ 371 (c)(1),
(2), (4) Date: Dec. 27, 2007

(87) PCT Pub. No.: WO2007/000587

PCT Pub. Date: Jan. 4, 2007

(65) Prior Publication Data

US 2008/0203293 A1 Aug. 28, 2008

(30) Foreign Application Priority Data

Jun. 27, 2005 (GB) ................................ 0513047.1

(51) Int. Cl.
*B01D 59/44* (2006.01)

(52) U.S. Cl. ....................... 250/292; 250/287; 250/288; 250/281

(58) Field of Classification Search ................. 250/281, 250/283, 282, 290, 286, 427, 292
See application file for complete search history.

(56) References Cited

U.S. PATENT DOCUMENTS 6,627,883 B2 * 9/2003 Wang et al. ................. 250/292

(Continued)

FOREIGN PATENT DOCUMENTS

WO WO 96/30930 10/1996
WO WO 2004/109743 12/2004

OTHER PUBLICATIONS

Ivanov et al., Moscow Physics-Engineering Institute, "Time-Of-Flight Mass Analyzer for Dust Impact Ion Source," Proceedings of IV International Seminar, Manufacturing of Scientific Space Instrumentation, VI. Instruments for Studying Space Plasma and Cosmic Rays, Sep. 18-24, 1989, Frunze, USSR, pp. 65-69.

(Continued)

*Primary Examiner*—Bernard E Souw
*Assistant Examiner*—Johnnie L Smith
(74) *Attorney, Agent, or Firm*—Charles B. Katz

(57) ABSTRACT

This invention relates generally to multi-reflection electrostatic systems, and more particularly to improvements in and relating to the Orbitrap electrostatic ion trap. A method of operating an electrostatic ion trapping device having an array of electrodes operable to mimic a single electrode is proposed, the method comprising determining three or more different voltages that, when applied to respective electrodes of the plurality of electrodes, generate an electrostatic trapping field that approximates the field that would be generated by applying a voltage to the single electrode, and applying the three or more so determined voltages to the respective electrodes. Further improvements lie in measuring a plurality of features from peaks with different intensities from one or more collected mass spectra to derive characteristics, and using the measured characteristics to improve the voltages to be applied to the plurality of electrodes.

21 Claims, 7 Drawing Sheets

U.S. PATENT DOCUMENTS

| | | | | |
|---|---|---|---|---|
| 6,998,622 | B1 * | 2/2006 | Wang et al. | 250/427 |
| 7,166,836 | B1 * | 1/2007 | Russ et al. | 250/281 |
| 7,183,542 | B2 * | 2/2007 | Mordehai | 250/287 |
| 7,518,106 | B2 * | 4/2009 | Dahl et al. | 250/286 |
| 2004/0149903 | A1 | 8/2004 | Wang | |
| 2005/0139763 | A1 | 6/2005 | Nagai et al. | |
| 2005/0279926 | A1 | 12/2005 | Terui et al. | |
| 2007/0181803 | A1 * | 8/2007 | Hasegawa et al. | 250/290 |
| 2008/0258053 | A1 * | 10/2008 | Makarov | 250/283 |
| 2008/0315080 | A1 * | 12/2008 | Makarov et al. | 250/281 |
| 2009/0166527 | A1 * | 7/2009 | Makarov | 250/282 |
| 2009/0166528 | A1 * | 7/2009 | Makarov | 250/282 |
| 2009/0206248 | A1 * | 8/2009 | Makarov et al. | 250/283 |
| 2009/0272895 | A1 * | 11/2009 | Makarov | 250/283 |

OTHER PUBLICATIONS

Alexander A. Makarov et al., "Pitfalls on the Road to the Ideal Time-Of-Flight Mirror: Ideal Time-Focusing in the Second Stage of Tandem Mass Spectrometers," International Journal of Mass Spectrometry and Ion Processes 146/147 (1995), pp. 165-182.

* cited by examiner

MULTI-ELECTRODE ION TRAP

FIELD OF THE INVENTION

This invention relates generally to multi-reflection electrostatic systems, and more particularly to improvements in and relating to the Orbitrap electrostatic ion trap.

BACKGROUND TO THE INVENTION

Mass spectrometers may include an ion trap where ions are stored either during or immediately prior to mass analysis. The achievable high performance of all trapping mass spectrometers is known to depend most critically on the quality of the electromagnetic fields used in the ion trap, including non-linear components of higher orders. This quality and its reproducibility are defined, in their turn, by the degree of control over imperfections in manufacturing the ion trap and the associated power supplies that provide signals to electrodes in the ion trap to create the trapping field. More complex assemblies are known to have greater difficulties in achieving required levels of performance because of larger spreads or accumulation of tolerances and errors, as well as increasingly troublesome tuning of the trapping field.

This problem is exemplified for the Orbitrap mass analyser, such as that described in U.S. Pat. No. 5,886,346. In this Orbitrap mass analyser, ions are injected in pulses from an external source such as a linear trap (LT) into a volume defined between an inner, spindle-like electrode and an outer, barrel-shaped electrode. Exceptional care is taken with the shape of these electrodes so that together their shapes can create as ideally as possible a so-called 'hyper-logarithmic' electrostatic potential in the trapping volume of the form:

$$U(r,z)=\frac{k}{2}\left(z^2-\frac{r^2}{2}\right)+\frac{k}{2}(R_m)^2\ln\left[\frac{r}{R_m}\right]+C$$

where r and z are cylindrical co-ordinates, C is a constant, k is the field curvature, and $R_m$ is the characteristic radius. The centre of the trapping volume is defined to be z=0 and the trapping field is symmetric about this centre.

Ions may be injected into the Orbitrap in various ways (either radially or axially). WO-A-02/078,046 describes some desirable ion injection parameters to ensure that ions enter the trapping volume as compact bunches of a given mass to charge m/z ratio, with an energy suitable to fit within the energy acceptance window of the Orbitrap mass analyser. Once injected, the ions describe orbital motion about the central electrode, with axial and radial trapping within the trapping volume achieved using static voltages on the electrodes.

The outer electrode is typically split about its centre (z=0), and an image current induced in the outer electrode by the ion packets is detected via a differential amplifier. The resultant signal is a time domain 'transient' which is digitised and fast Fourier transformed to give, ultimately, a mass spectrum of the ions present in the trapping volume.

The gap splitting the outer electrode may be used to introduce ions into the trapping volume. In this case, ions are excited to induce axial oscillations in addition to the orbital motion. Alternatively, the ions may be introduced at a location displaced along the axis from z=0, in which case the ions will automatically assume an axial oscillation in addition to the orbital motion.

The precise shape of the electrodes and the resultant electrostatic field result in ion motion which combines axial oscillations with rotation around the central electrode. In an ideal trap, the hyper-logarithmic field does not contain any cross-terms in r and z such that the potential in the z direction is purely quadratic. This results in ion oscillations along the z-axis that may be described as an harmonic oscillator, independent of the ions' (x, y) motion. In this case, the frequency of the axial oscillations is related only to the mass to charge ratio (m/z) of ions as:

$$\omega=\sqrt{\frac{k}{m/z}}$$

where ω is the frequency of oscillation and k is a constant.

The high performance and resolution required places a high requirement on the quality of the field produced in the trapping volume. This in turn places a high requirement on perfecting the shape of the electrodes. It is perceived that any deviations from the ideal electrode shape will introduce non-linearities. This results in the frequency of axial oscillations becoming dependent upon factors other than purely the mass to charge ratio of the ions. The consequence of this is that factors such as mass accuracy (peak position), resolution, peak intensity (related to ion abundance) and so forth may be compromised, possibly to the extent of becoming unacceptable. Mass production of the electrode shapes to such an exacting tolerance, therefore, is a challenge.

The Orbitrap mass spectrometer is only a particular case of a more general class of substantially electrostatic multi-reflection systems which are described in the following non limiting list: U.S. Pat. No. 6,013,913, U.S. Pat. No. 6,888,130, US-A-2005-0151076, US-A-2005-0077462, WO-A-05/001878, US-A-2005/0103992, U.S. Pat. No. 6,300,625, WO-A-02/103747 or GB-A-2,080,021.

SUMMARY

Against this background, and in a first aspect, this invention provides a method of operating an electrostatic ion trapping device having an array of electrodes operable to mimic a single electrode, the method comprising determining three or more different voltages that, when applied to respective electrodes of the plurality of electrodes, generate an electrostatic trapping field that approximates the field that would be generated by applying a voltage to the single electrode, and applying the three or more so determined voltages to the respective electrodes.

In this way, any imperfections in a single electrode may be corrected by using an array of electrodes and by determining voltages to be applied to the electrodes to ensure that the trapping field is of a better quality. Any imperfections in the electrodes, in either their shape or their position, will lead to imperfections in the trapping field and this, in turn, will manifest itself in the mass spectra taken from ions trapped in the trapping field.

Optionally, the method comprises applying the voltages to the respective electrodes to approximate a hyper-logarithmic trapping field. This is particularly advantageous in electrostatic mass analysers like the Orbitrap analyser. The array of electrodes may be shaped such that their surfaces that border a trapping volume of the ion trapping device follow an equipotential of the hyper-logarithmic field, and the method may then comprise applying the three or more voltages to the respective electrodes to produce a desired equipotential. Put another way, the surface bordering the trapping volume adopts an equipotential of the trapping field produced in the trapping volume.

The surfaces of the array of electrodes may curve to follow the equipotential of the hyper-logarithmic field or, alternatively, the surfaces of the array of electrodes may be stepped to follow the equipotential of the hyper-logarithmic field. In a further alternative arrangement, wherein the array of electrodes may approximate the inner or outer surface of a cylinder, the method comprising applying the three or more voltages to the respective electrodes to match the potential of the desired hyper-logarithmic field where it meets the edge of each respective electrode.

Optionally, the electrodes may comprise an array of plate electrodes extending in spaced arrangement along a longitudinal axis of the trapping volume, and the method may comprise applying the voltages to the array of plate electrodes. In another contemplated embodiment, the edges of the plate electrodes define the surface of the inner or outer electrode that borders the trapping volume and the method comprises applying voltages to the plate electrodes to match the potential of the desired hyper-logarithmic field where it meets its edge. In this way, the plate electrodes are used to set potentials matching the boundary conditions of the trapping field where it meets the electrodes. Such an approach allows the use of surfaces that do not follow equipotentials. For example, an array of ring electrodes may be used to define a cylindrical electrode.

The hyper-logarithmic trapping field may be symmetrical about the centre of a trapping volume of the trapping device, and the array of electrodes may also be arranged symmetrically about the centre of the trapping volume. This is advantageous because it allows a common voltage to be applied to symmetrically-disposed pairs of electrodes.

Preferably, the step of determining the three or more voltages to be applied to the respective electrodes comprises: (a) applying a first set of the three or more voltages to the respective electrodes thereby producing a trapping field to trap a test set of ions in the trapping volume such that the trapped ions adopt oscillatory motion; (b) collecting one or more mass spectra from the trapped ions and measuring a plurality of features of the one or more mass spectra to derive one or more characteristics; and (c) comparing the one or more measured characteristics to one or more tolerance values. If the one or more measured characteristics meets the one or more tolerance values, the controller: (d) uses the first set of three or more voltages as the determined three or more voltages. If the one or more measured characteristics do not meet the one or more tolerance values, the controller: (e) uses the one or more measured characteristics to improve the voltages to be applied to the respective electrodes; and (f) repeats steps (a) through (c).

Measuring a characteristic of the ions, such as a peak shape in a mass spectrum, and comparing the characteristic with a known value allows the voltages applied to the electrodes to be improved such that a better trapping field may be generated.

Preferably step (b) comprises measuring the plurality of features from peaks with different intensities. The peaks may be form the same mass spectrum. In addition, step (c) may comprise comparing one or more corresponding measured characteristics of the peaks with different intensities with the one or more tolerance values to ensure the spread between the measured characteristics is within a tolerated range.

It has been observed that measured parameters of ions are actually different for peaks of different intensities in electrostatic traps, even for the same m/z. The underlying physical cause is the number of ions in a particular mass peak. As the number of ions increases, complex interactions due to space charge with electrostatic fields start to take place. These interactions can completely change the dynamics of ions and hence the analytical parameters of the electrostatic trap, especially for non-linear electric fields.

It has been discovered that correct tuning of the electrostatic trap requires multi-parametric optimisation of the system in a way that is different from the prior art: optimisation of the analytical parameters for a mass peak of one intensity needs to be accompanied by continuous monitoring of analytical parameters for a mass peak of another intensity, the latter preferably being different (even vastly different) from the former. In practical terms, mass peak intensities differ preferably by a factor between 2 and 1000.

In this particular context, "intensity" is defined as a displayed characteristic which reflects the number of ions that gives rise to the corresponding mass peak. This new way of tuning becomes necessary because, unlike in beam instruments such as magnetic sectors, quadrupole, time-of-flight mass spectrometers, etc., tuning conditions in electrostatic traps could be different for different peak intensities. So it is important to optimise e.g. resolving power even in a narrow mass range not only for a single peak (as typically done in mass spectrometry), but also for peaks of other intensities such as isotopes of the same peak.

Generally, the "proper" tuning should give similar improvement for all peak intensities over a wide mass range and, importantly, the spread of "measured characteristics" between peaks of different intensities (but similar m/z) should be minimised. The importance of such tuning is especially high in multi-electrode electrostatic traps where high dimensionality of the search space requires exceptionally effective algorithms. The present invention proposes both general and specific approaches to such tuning, starting from the above described selection criteria and down to the most appropriate electrode configurations.

Any number of features may be used to derive the characteristics that improve the voltages applied to the electrodes. For example, a feature may correspond to peak position, peak amplitude, peak width, peak shape, peak resolution, signal to noise, mass accuracy or drift. Peaks at multiple m/z are preferably used. Also, relative values may be used, e.g. the amplitude of a peak relative to another peak, the width of a peak relative to another peak, etc. The one or more characteristics relate to the fidelity of the mass spectrum, although other characteristics including monotonicity or smoothness of the voltage distribution, parameters of the mass calibration equation, injection efficiency or stability of tuning to perturbations of control parameters may be used, either in addition or as an alternative.

The method includes improving the voltages applied to the electrodes. These improvements may be made iteratively, such that small adjustments are made to the voltages to obtain an optimum trapping field progressively. For example, it allows an initial guess to be made as to how to improve the voltages, the response of the measured characteristic to this change can be measured, and then a better guess at how to improve the voltages can be made accordingly. Optionally, the iterative method is implemented as a simplex method, an evolutionary algorithm, a genetic algorithm or other suitable optimization.

In order to cover all possibilities arising during the analysis of real-life samples, it is preferred that the test set of ions be as representative as possible of the analyte ions that will follow. This means that it is preferred that the one or more characteristics should be derived from not a single m/z (like, for example, would be the case for lock-mass correction), but for multiple m/z. Also, the one or more characteristics are preferably measured for different intensities, both for the total number of ions and also of particular peaks, so that space charge effects could be taken into account. In the current practice, total ion intensity is frequently used in FT ICR mass spectrometers to correct space-charge related mass shifts.

Apparent improvements in peak shape may be an artifact of self-bunching rather than true improvement of the peak shape (see, for example, GB0511375.8). As noted above, it is advantageous to check improvement in peak shapes also for significantly less intense peaks in the same or a different spectrum. Such multi-parametric measurement of the one or more characteristics will provide optimal improvement.

Preferably, the method may comprise improving the voltages so as to produce a trapping field that improves maintenance of the isochronicity or coherence of the oscillating trapped ions. Loss in coherence in the orbiting ions often leads to degradation of mass spectra, particularly where measurement of an image current is used. Accordingly, optimising the trapping field helps maintain the coherence of the orbiting ions producing improved mass spectra. Where a mass spectrum is collected over a detection time, the voltages may be improved so that any drift in phase associated with loss in coherence is less than $2\pi$ during the detection time.

In some mass analysers, such as the Orbitrap mass analyser, mass spectra are collected by measuring the frequencies of the axial component of oscillation, in which case it is desirable to optimise maintenance of the coherence of the axial component of oscillation of the trapped ions.

In a contemplated embodiment, the edges of the array of electrodes define the surface of the inner or outer electrode that borders the trapping volume such that the surface at least approximately follows an equipotential of the hyper-logarithmic field, and the method comprises applying a common voltage to the plate electrodes and using the characteristic to determine an improved voltage to be applied to each plate electrode. Essentially, this method assumes the plate electrodes all to be perfectly formed and perfectly positioned such that the same voltage may be applied to each. In reality, perfection will not be achieved, but using the measured characteristic allows an improved voltage to be applied to each plate electrode to compensate for imperfections.

From a second aspect, the present invention resides in a method of analysing ions trapped in a trapping volume of a mass spectrometer, comprising: (a) applying voltages to a plurality of electrodes thereby producing a trapping field to trap a test set of ions in the trapping volume such that the trapped ions adopt oscillatory motion; (b) collecting one or more mass spectra from the trapped ions and measuring a plurality of features from peaks with different intensities from the one or more mass spectra to derive one or more characteristics; and (c) comparing the one or more measured characteristics to one or more tolerance values. If the one or more measured characteristics meets the one or more tolerance values, the method further comprises: (d) applying the voltages to the plurality of electrodes to trap a set of analyte ions in the trapping volume such that the trapped ions adopt oscillatory motion; and (e) collecting one or more mass spectra from the analyte ions trapped in the trapping volume. If the one or more measured characteristics do not meet the one or more tolerance values, the method further comprises: (f) using the one or more measured characteristics to improve the voltages to be applied to the plurality of electrodes; and (g) repeating steps (a) through (c).

BRIEF DESCRIPTION OF THE DRAWINGS

In order that the invention may be more readily understood, reference will now be made, by way of example only, to the following drawings, in which:—

DETAILED DESCRIPTION OF EMBODIMENTS OF INVENTION

Figure 1:
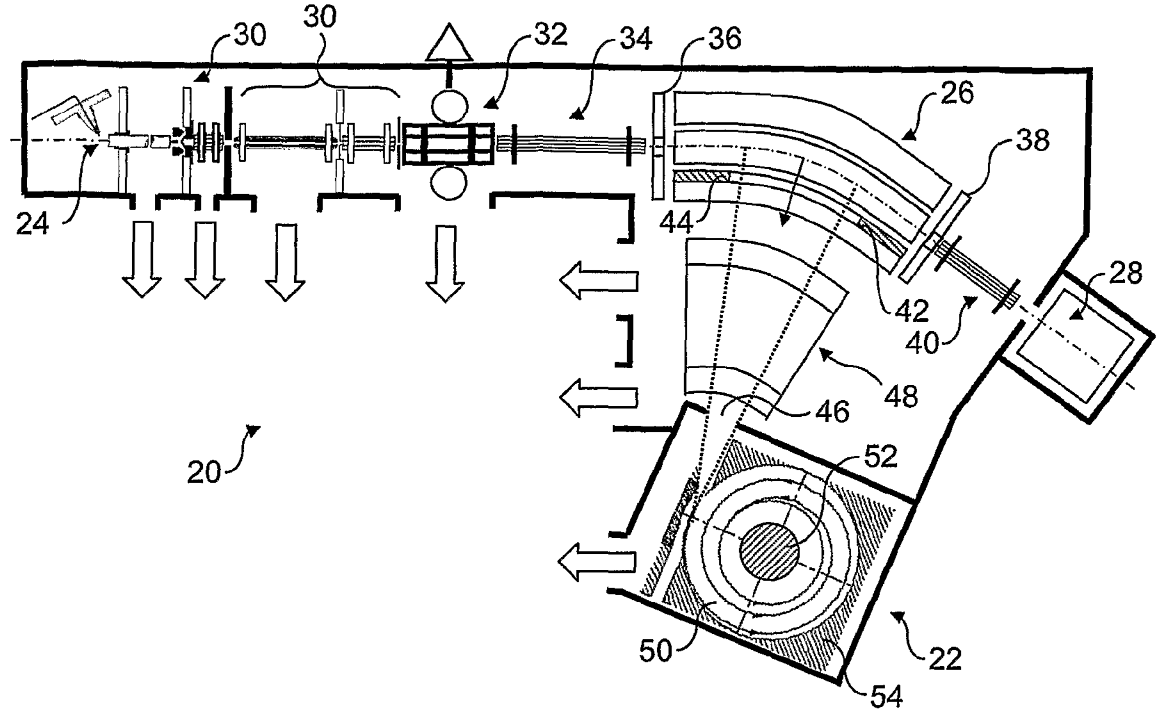
FIG. 1 is a schematic representation of a mass spectrometer including an Orbitrap mass analyser according to an embodiment of the present invention.

An example of a mass spectrometer 20 with which an electrostatic mass analyser 22, such as an Orbitrap mass analyser, according to the present invention may be used is shown in FIG. 1. The mass spectrometer 20 shown is but merely an example and other arrangements are possible.

The mass spectrometer 20 is generally linear in arrangement, with ions passing between an ion source 24 and an intermediate ion store 26 where they are trapped. Ions are ejected in pulses orthogonally to the axis from the intermediate ion store 26 into the Orbitrap mass analyser 22. Optionally, ions may be ejected axially from the intermediate ion store 26 to a reaction cell 28 before being returned to the intermediate ion store 26 for orthogonal ejection to the Orbitrap mass analyser 22.

In more detail, the front end of the mass spectrometer 20 comprises an ion source 24 supplied with analyte ions. Ion optics 30 are located adjacent the ion source 24, and are followed by a linear ion trap 32 that may be operated in either trapping or transmission modes. Further ion optics 34 are located beyond the ion trap 32, followed by a curved quadrupolar linear ion trap that provides the intermediate ion store 26. The intermediate ion store 26 is bounded by gate electrodes 36 and 38 at its ends. Ion optics 40 are provided adjacent the downstream gate 38 to guide ions to and from the reaction cell 28.

Ions are also ejected orthogonally from the intermediate ion store 26 through a slit 42 provided in an electrode 44 in the direction of the entrance 46 to the Orbitrap mass analyser 22. Further ion optics 48 reside between the intermediate ion store 26 and the Orbitrap mass analyser 22 that assist in focussing the emergent pulsed ion beam. It will be noted that the curved configuration of the intermediate ion store 26 also assists in focussing the ions. Furthermore, once ions are trapped in the intermediate ion store 26, potentials may be placed on the gates 36 and 38 and to cause the ions to bunch in the centre of the intermediate ion store 26, also to aid focussing.

Figure 2:
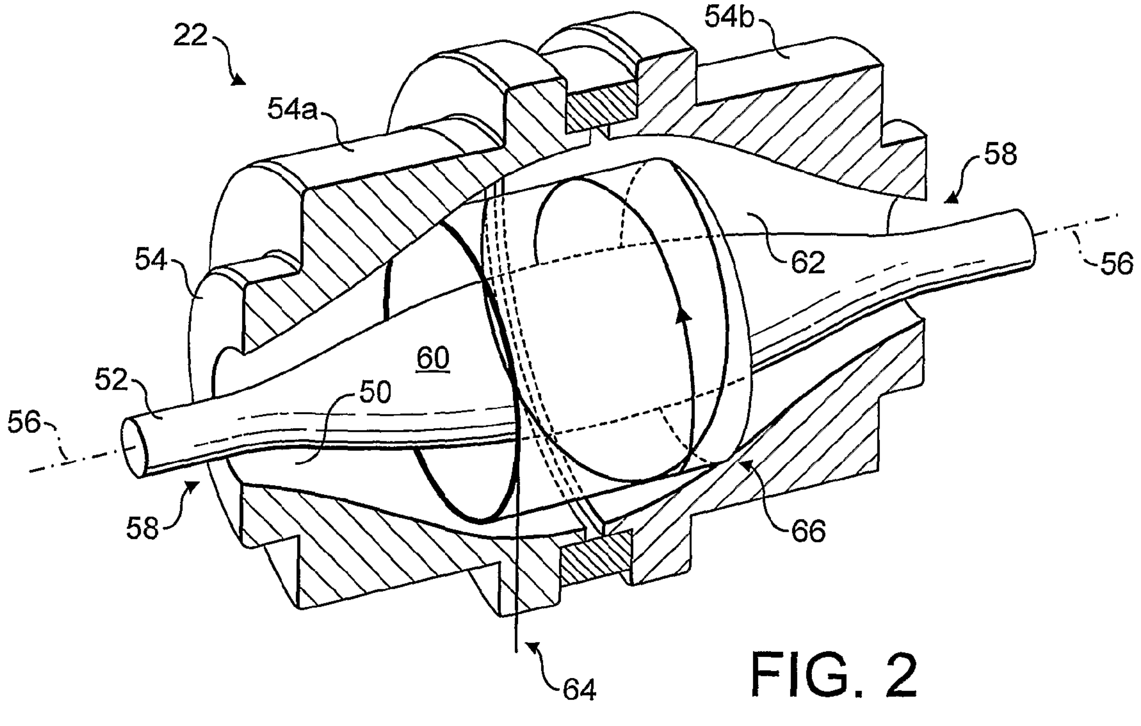
FIG. 2 is a cut-away perspective view of electrodes of the Orbitrap mass analyser of FIG. 1.

As described above, an Orbitrap mass analyser 22 comprises a trapping volume 50 defined by an inner, spindle-like electrode 52 and an outer, barrel-like electrode 54. FIG. 1 shows the trapping volume 50 and associated electrodes 52 and 54 as a cross-section through their centre (z=0). FIG. 2 shows the electrodes 52 and 54 of an Orbitrap mass analyser 22 according to the prior art in perspective. The trapping volume 50 has a longitudinal axis 56 that defines the z axis, with the centre of the trapping volume 50 defining z=0. Both inner and outer electrodes 52 and 54 are elongate and are arranged to be coaxial with the z axis. Both electrodes 52 and 54 terminate at respective open ends 58.

The inner electrode 52 is one-piece and its outer surface 60 is machined to define as accurately as possible the required hyper-logarithmic shape. Thus, a voltage can be applied to this inner electrode 52 and the outer surface 60 should adopt the required equipotential of the hyper-logarithmic field to be produced in the trapping volume 50.

The outer electrode 54 is hollow, being generally annular in cross-section. The void it defines at its centre receives the inner electrode 52, the trapping volume 50 being defined between the inner electrode 52 and the outer electrode 54. The inner surface 62 of the outer electrode 54 is also carefully machined to have the required hyper-logarithmic shape. Hence, when a potential is applied to the outer electrode 54, its inner surface 62 adopts the required equipotential of the hyper-logarithmic field to be produced in the trapping volume 50. Thus, a hyper-logarithmic field is produced extending between the equipotentials adopted by the opposed outer surface 60 and inner surface 62 of the electrodes 52 and 54.

The outer electrode 54 is split in two at z=0 to form two equal halves 54*a* and 54*b*. The outer electrode 54 also functions as a detection electrode: being split in two enables collection of mirror currents induced by the orbiting ion packets. A differential signal is obtained from the two halves of the outer electrode 54 that provides a transient corresponding to the harmonic axial oscillations of the ions.

The gap between the two halves of the outer electrode 54 may be used as the entrance for ion packets injected tangentially into the trapping volume 50. Injecting ions tangentially at z=0 results in orbital motion of the ions only. An additional excitation field, or a change in the trapping field, is required to initiate axial oscillations of the ions.

Alternatively, a separate aperture may be provided displaced along the z axis for the injection of ion packets as shown at 64, in which case the ions will automatically adopt axial oscillations as shown at 66. The voltages applied to the inner and outer electrodes 52 and 54 are chosen to produce a stable trapping field for trapping ions of the required m/z range. This results in the coherent motion of ion packets orbitally about the inner electrode 52 and axially about z=0. Upon introduction to the trapping volume 50, the ion packets follow spiral paths near the outer electrode 54 (i.e. at a larger radial distance) and with relatively large axial oscillations. Ion paths equally distanced from the inner and outer electrodes 52 and 54 are preferred in order to minimise tolerance requirements for both electrodes 52 and 54. To achieve this, the voltages on the electrodes 52 and 54 are ramped up as the ion packets are introduced into the trapping volume 50 such that their orbits move inwardly, both radially and axially.

As has been described above, achieving the required tolerances when shaping the electrodes 52 and 54 is a challenge. The deviations from an ideal hyper-logarithmic trapping field caused by the inevitable imperfections in the electrodes' shape results in a loss of resolution as the ions lose their spatial coherence.

Figure 3:
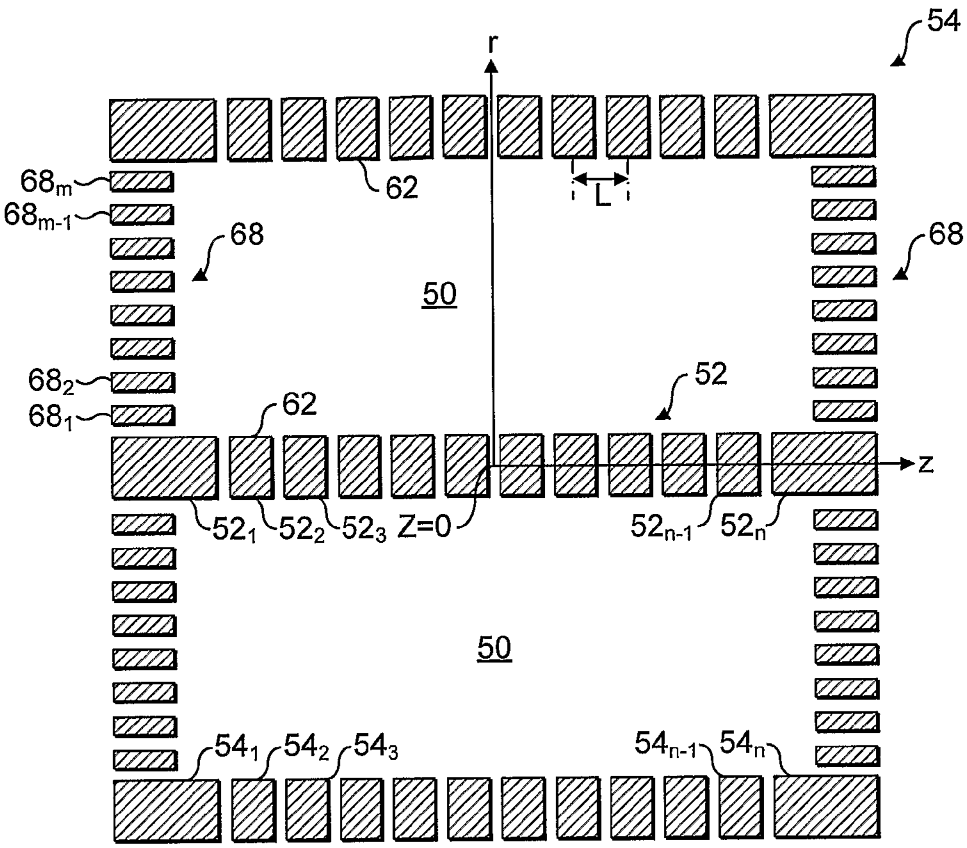
FIG. 3 is a sectional view of electrodes in an Orbitrap mass analyser according to a first embodiment of the present invention.
Figure 4:
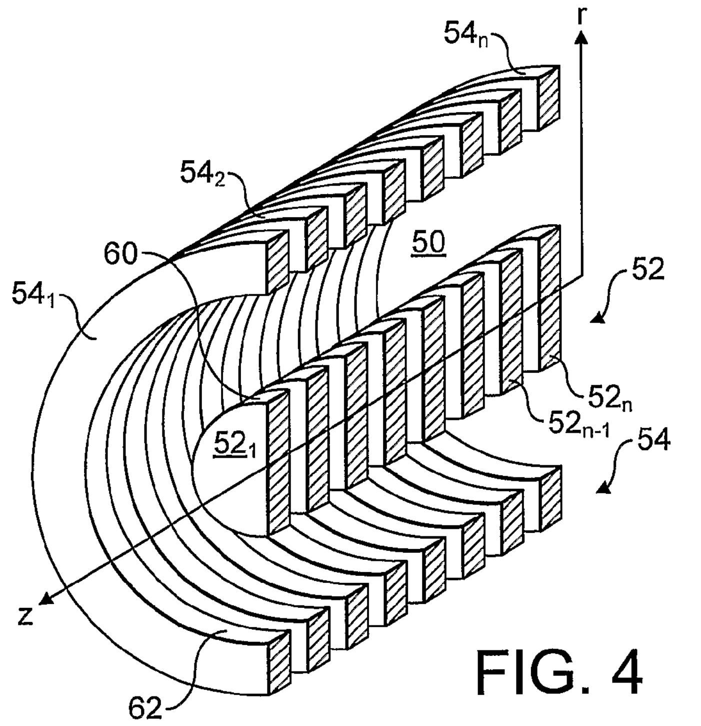
FIG. 4 is a cut-away perspective view of the electrodes of FIG. 3.

FIG. 3 corresponds to a cross-section taken along the z axis of the electrodes 52, 54 and 68 of an Orbitrap mass analyser 22 according to a first embodiment of the present invention, and FIG. 4 shows the inner and outer electrodes 52 and 54 in perspective. In contrast to FIG. 2, the outer electrode 54 defines a cylindrical shape. The ends of the trapping volume 50 are closed by end electrodes 68 (shown only in FIG. 3), rather than being open as in FIG. 2. The inner electrode 52 is also cylindrical. Inner and outer electrodes 52 and 54 remain coaxial with the z axis.

The electrostatic mass analyser 22 of FIGS. 3 and 4 uses a quite different approach to generate the desired hyper-logarithmic field. The inner and outer electrodes 52 and 54 of FIG. 2 are shaped such that their respective outer and inner surfaces 60 and 62 follow equipotentials, thereby allowing almost the same voltage to be applied to each of the inner electrode 52 and outer electrode 54. This favoured approach of perfecting electrode shape has been abandoned such that, in FIGS. 3 and 4, the inner surface 62 of the outer electrode 54 and the outer surface 60 of the inner electrode 52 are no longer shaped to follow equipotentials but instead merely define plain cylindrical surfaces. The notional equipotentials of the ideal hyper-logarithmic field will thus meet the inner and outer electrodes 52 and 54 at a series of points along the length of these electrodes 52 and 54.

To generate the required hyper-logarithmic field, the inner and outer electrodes 52 and 54 are operated to have a potential that matches the various equipotentials where they intersect. This is achieved by dividing the inner electrode 52 and the outer electrode 54 into an axially-extending series of ring electrodes $\mathbf{52}_1$ to $\mathbf{52}_n$ and $\mathbf{54}_1$ to $\mathbf{54}_n$. The ring electrodes $\mathbf{52}_{1 \ldots n}$ and $\mathbf{54}_{1 \ldots n}$ are arranged to be symmetrical about z=0. This symmetry is useful because the equipotentials are also symmetrical about z=0, and so the ring electrodes $\mathbf{52}_{1 \ldots n}$ and $\mathbf{54}_{1 \ldots n}$ may be treated in pairs such as $\mathbf{52}_1$ and $\mathbf{52}_n$, $\mathbf{52}_2$ and $\mathbf{52}_{n-1}$, etc.

Small gaps are left between each ring electrode $\mathbf{52}_{1 \ldots n}$ and $\mathbf{54}_{1 \ldots n}$ in both the inner electrode 52 and the outer electrode 54. These gaps are preferably at least two to three times smaller than the distance to the nearest orbiting ions during detection. To help field definition, the end electrodes 68 are provided. These end electrodes 68 each comprise a series of radially-extending concentric ring electrodes $\mathbf{68}_1$ to $\mathbf{68}_m$ that reside between respective ends of the inner electrode 52 and outer electrode 54.

In order to provide the necessary voltages to the ring electrodes $\mathbf{52}_{1 \ldots n}$ and $\mathbf{54}_{1 \ldots n}$ of both the inner electrode 52 and the outer electrode 54, a resistive network 70 is used in this embodiment. The symmetry of the ring electrodes $\mathbf{52}_{1 \ldots n}$ and $\mathbf{54}_{1 \ldots n}$ means that, for each electrode 52 and 54, a single resistive network 70 may be provided to supply the required voltages. In this configuration, each voltage is applied to a ring electrode (e.g. $\mathbf{52}_1$, $\mathbf{52}_2$, etc) and its corresponding twin (e.g. $\mathbf{52}_{n-1}$, $\mathbf{52}_n$, etc) in the other symmetrical half of the respective electrode 52 or 54. However, to obtain better accuracy it is preferred to use two corresponding but separate resistive networks $\mathbf{70}_1$ to $\mathbf{70}_4$ for each of the inner electrode 52 and outer electrode 54. In addition, a resistive network $\mathbf{70}_5$ and $\mathbf{70}_6$ is provided for each of the end electrodes 68.

Figure 5:
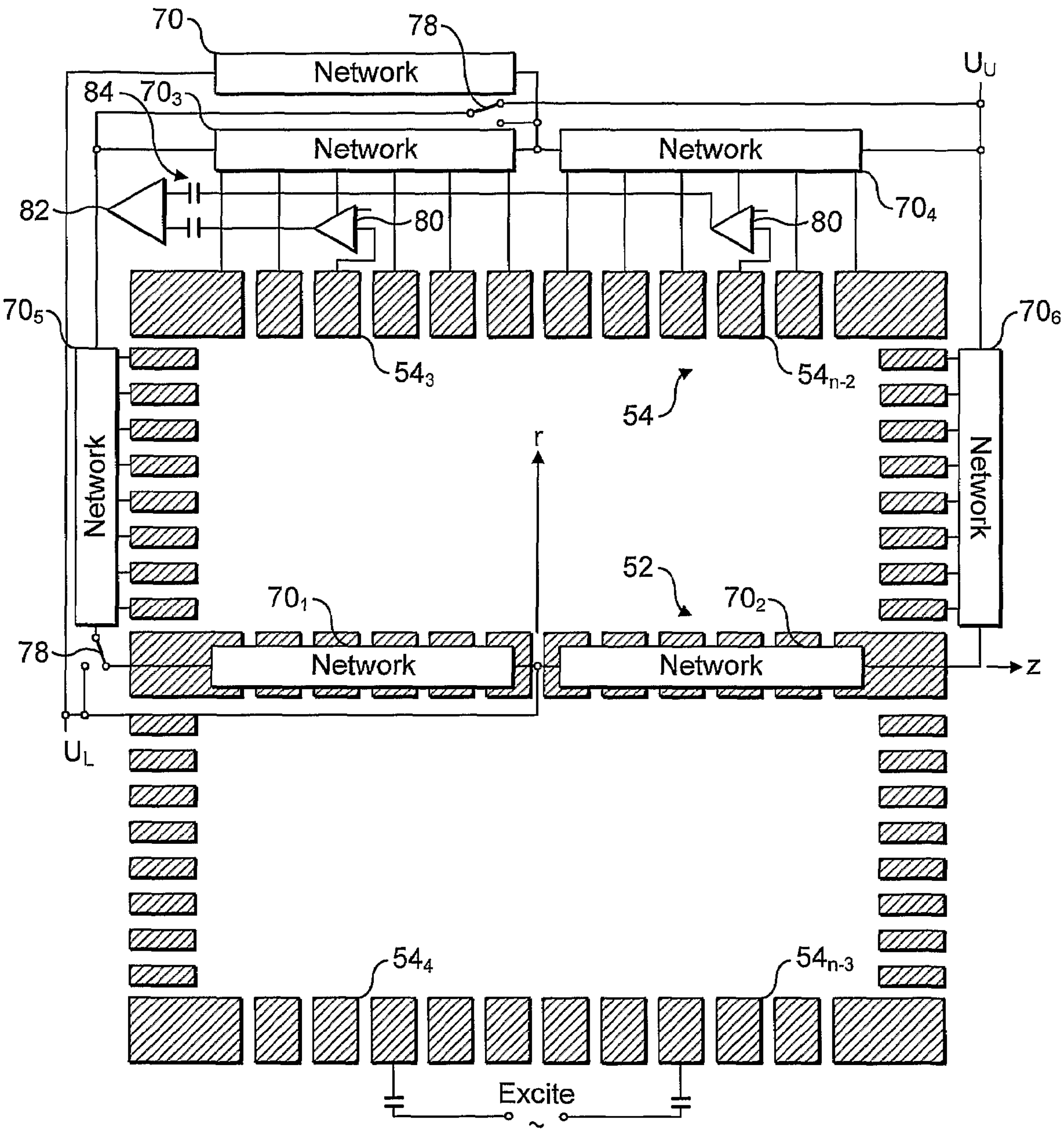
FIG. 5 corresponds to FIG. 3, and shows a power supply network for providing voltages on the electrodes.

FIG. 5 shows the electrode arrangement of FIG. 3 with the resistive networks $\mathbf{70}_1$ to $\mathbf{70}_6$ that supply the appropriate voltages to the ring electrodes $52_{1 \ldots n}$, $54_{1 \ldots n}$ and $68_{1 \ldots m}$ added. Two networks $70_1$ and $70_2$ supply voltages to respective symmetrical halves of the inner electrode 52. Similarly, two networks $70_3$ and $70_4$ supply voltages to respective symmetrical halves of the outer electrode 54. As noted above, networks $70_2$ and $70_4$ may be omitted and networks $70_1$ and $70_3$ may supply matching voltages to each corresponding pair of the symmetrical ring electrodes $52_{1 \ldots n}$ and $54_{1 \ldots n}$.

A problem with using resistive networks 70 is the inaccuracies in the nominal values of resistors (it is difficult to manufacture a resistor to an accuracy better than 0.1%). In addition, thermal drift of conventional high-voltage resistors is substantial (tens ppm/° C.). These problems manifest themselves in the accuracy that may be obtained for the trapping field. In this particular example where a hyper-logarithmic field is required, a great variety of resistors is required. As a result, field definition tends to suffer leading to limited resolving power in the mass spectrometer 20.

These problems may be addressed using computer-controlled resistive networks 70. These networks 70 are used to tune voltage differences between adjacent ring electrodes $52_{1 \ldots n}$, $54_{1 \ldots n}$ and $68_{1 \ldots m}$ using adaptive algorithms in a feedback loop, as will be described in more detail below.

Figure 6:
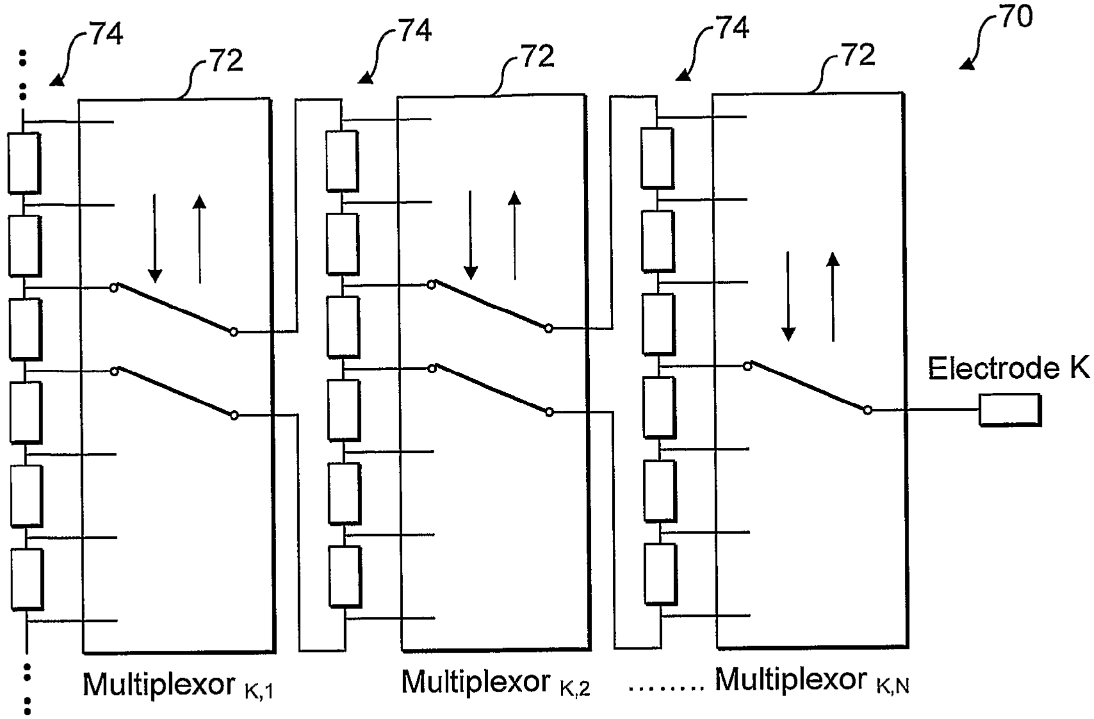
FIG. 6 shows a nested resistive network that may be used to place a voltage on an electrode.

FIG. 6 shows one implementation of such a computer-controlled resistive network 70. The resistive network 70 comprises massive sets of low-voltage, high-accuracy resistors (e.g. 1MΩ, 3 ppm/° C. in a thermostatic environment). Significantly more resistors than ring electrodes $52_{1 \ldots n}$, $54_{1 \ldots n}$ and $68_{1 \ldots m}$ are used. Computer control of the resistor networks 70 is performed using galvanically-isolated switching of slow multiplexers 72. Each multiplexer 72 covers a local network of resistors 74 that span the range of voltage values that are supplied to any particular ring electrode $52_{1 \ldots n}$, $54_{1 \ldots n}$ and $68_{1 \ldots m}$. A dramatic improvement in resistor accuracy may be achieved using a nested network. For monotonous fields, such as the hyper-logarithmic field here, such range of voltages do not overlap for adjacent ring electrodes $52_{1 \ldots n}$, $54_{1 \ldots n}$ and $68_{1 \ldots m}$ so that the local networks 72 may be connected sequentially and powered by a single power supply. Manual operation is also possible, for example using DIP-switches.

Figure 7:
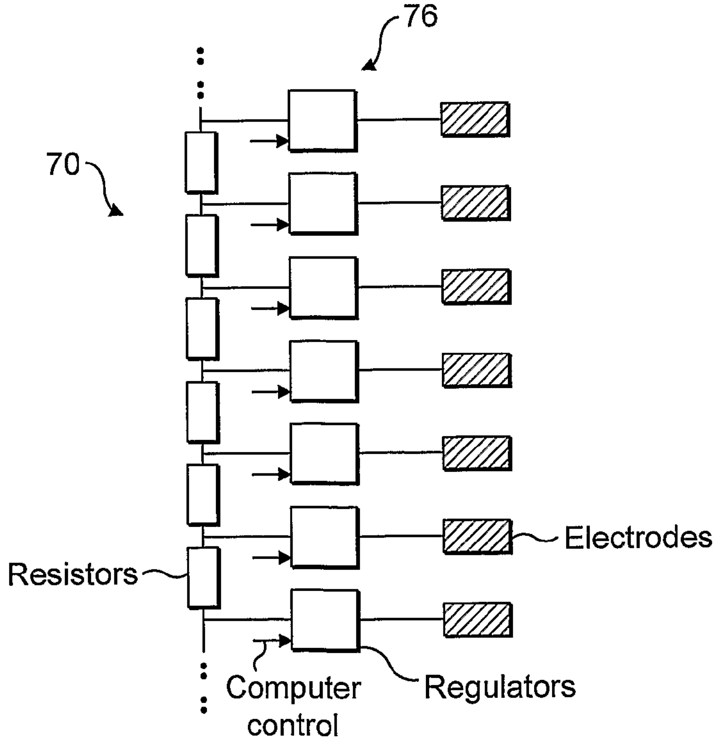
FIG. 7 shows a regulated resistive network that may be used to place voltages on electrodes.

FIG. 7 shows an alternative implementation for the computer-controlled resistive networks 70. Here, the voltage drop between adjacent ring electrodes is provided by a traditional resistive network 70, but fine tuning of the voltage on each ring electrode $52_{1 \ldots n}$, $54_{1 \ldots n}$ and $68_{1 \ldots m}$ is performed by a floating low-voltage, high-accuracy power supply/regulator 76. Preferably each regulator 76 is opto-coupled to the computer control. As only very low currents are required, this arrangement allows simpler schematics for the regulators 76.

The voltage supply network need not be resistive at all, especially when the cost and stability advantage of resistors compared to digital voltage regulators decreases.

An advantage of the current invention is to minimise complexity of electrode shapes thus making them easier to manufacture and, at the same time, to compensate increased uncertainty of their mutual positioning by adaptive optimisation of voltages applied to the electrodes 52 and 54. This optimisation may be carried out on the basis of one or more mass spectra acquired by the mass spectrometer 20 utilising these electrodes 52 and 54, and analysing ions from a calibration mixture. For example, peak shape or peak-width at 50%, 10%, 1% of peak height for ions from a wide m/z range could be used, both for main peaks and their isotopic peaks (to discriminate against self-bunching effects, see UK Patent Application 0511375.8). Preferably, the mass spectrum is acquired using image current detection using one of the electrodes 52 and 54. Alternatively, a resonance ejection scan or a mass-selective instability scan to a secondary electron multiplier could be used as described in U.S. Pat. No. 5,886,346 or A. Makarov, Anal. Chem., v. 72, 2000, 1156-1162.

For image current detection (the preferred method of detection), both resolving power and sensitivity are maximised if decay of the transient is minimised, i.e. loss of coherence due to divergence of phases is minimised. As complete loss of coherence occurs when phase spread reaches π, good parameters necessarily require that phase spread remains much less than 2π, or less stringently, much less than 2π over the entire time of acquisition. Therefore this condition could be also used as a criterion for tuning voltages on electrodes 52 and 54.

In either the embodiments of FIG. 5 or FIG. 6, computer control is preferably performed using genetic or evolutionary algorithms. Several initial settings are randomly generated (e.g. the settings for each multiplexer 72), and these settings are changed according to genetic rules such as mutation, cross-over, selection of the fittest, random introductions, etc. The new settings are tested and again updated, and so on iteratively until a global optimum is reached.

Optimisation of voltages on ring electrodes is carried out under computer control preferably using evolutionary algorithms (EAs) (Corne et al (eds) (1989), *New ideas in Optimisation*, McGraw-Hill; H. P. Schwefel (1995), *Evolution and Optimum Seeking*, Wiley: NY). EAs are global optimisation methods based on several analogues from biological evolution.

One analogue is the concept of a breeding population in which the fittest individuals have a higher chance of producing offspring and passing their genetic information onto succeeding generations. In this invention, the set of voltages (or resistor values) on ring electrodes $52_{1 \ldots n}$, $54_{1 \ldots n}$ and $68_{1 \ldots m}$ will act as an individual while fitness criterion will be mainly (though not exclusively) the minimum of ion dephasing over measurement time (preferably, measured for ions of different m/z and intensity).

Another analogue is the concept of crossover in which an offspring's genetic material is a mixture of his parents. In this invention, it will mean partial exchange of voltage (or resistor) values between different sets.

Another analogue is the concept of mutation wherein genetic material is occasionally corrupted thus maintaining a certain level of genetic diversity in the population. For example, some voltage (or resistor) values could be randomly varied.

Immensely large search spaces have proven no barrier to effective EA search, with each generation taking only a few seconds. Examples of EAs include mimetic algorithms, particle swarm algorithms, differential evolution, etc.

In the first step of the algorithm, random sets of voltage/resistor values are selected, though it is possible even on this stage to limit selection to monotonous voltage distributions only. By measuring mass spectrum for different m/z and isotopic peaks over wide mass range, a composite fitness value is assigned to each set. Then selection is performed: only the fittest sets are allowed to survive, with all others abandoned. The next generation of the same size is produced from the surviving sets and their offspring produced by mutation and crossover. After that, the next evolution cycle takes place. The speed and success rate of the evolution will be improved by balancing mutation, crossover and survival rates.

A method of operation of the Orbitrap mass analyser 22 of FIGS. 3 and 4 will now be described. Pulses of ions are injected into the trapping volume 50, either axially or radially.

For axial ("spiralling") injection, the voltage distribution on one of the symmetrical halves of the trapping volume 50 is switched off, for example by shorting out the appropriate resistive networks $\mathbf{70}_1$ and $\mathbf{70}_3$ using the switches 78 shown in FIG. 5. Ions move in along a spiral of a constant radius. A radial potential distribution is still provided by virtue of network $\mathbf{70}_5$.

Ion packets are then injected tangentially between the ring electrodes $\mathbf{68}_{1 \ldots m}$ of an end electrode 68 such that the ions have a small component of velocity in the z-axis direction. The remaining field causes the ions to spiral about the inner electrode 52 at a constant radius until they reach the centre of the trapping volume 50 and experience the axial retarding field created by resistive networks $\mathbf{70}_2$ and $\mathbf{70}_4$. At that moment, resistive networks $\mathbf{70}_1$ and $\mathbf{70}_3$ are switched back on and the ions are thus constrained between two axial retarding fields. As an alternative, the resistive networks $\mathbf{70}_1$ and $\mathbf{70}_3$ may be slowly ramped up as the ions spiral towards the centre.

For radial ("squeezing") ion injection, ions are injected tangentially between ring electrodes $\mathbf{54}_{1 \ldots n}$ of the outer electrode 54 (either at or offset from z=0). The voltage difference between the inner electrode 52 and the outer electrode 54 is rapidly ramped up during ion injection, for example by switching on voltages using a high-voltage switch. The time constant of the ramp is determined by the resistance of the resistive networks 70 and the total capacitance between ring electrodes $\mathbf{52}_{1 \ldots n}$ and $\mathbf{54}_{1 \ldots n}$. This gradually shrinks the radius of rotation and squeezes the ions towards the centre of the trapping volume 50, as described above.

As another alternative, ions may be ejected into the trapping volume 50 (either radially or axially) with the trapping field switched off completely. Once the ions in the m/z range of interest are in the trapping volume 50, the resistive networks 70 may be switched on to create the radial and axial potential wells. This method is of greater use when narrower mass ranges are of interest (for example, for precursor ion selection with subsequent MS/MS).

With ion packets trapped in the trapping volume 50, excitation of the ions may be performed. This will not always be necessary, for example where ions have been introduced offset from z=0 such that they automatically adopt axial oscillations. Nonetheless, excitation of ions for image current detection or selection of certain m/z ranges may be desired. This excitation may be performed using known techniques for ion traps, e.g. using RF voltages within a range of frequencies to a pair of ring electrodes $\mathbf{54}_4$ and $\mathbf{54}_{n-3}$ (as shown in FIG. 5) or a set of ring electrodes $\mathbf{52}_{1 \ldots n}$ and $\mathbf{54}_{1 \ldots n}$. Radial, axial or mixed fields may be used. Due to the presence of resistive networks 70, excitation could be directly capacitively coupled to the ring electrodes $\mathbf{52}_{1 \ldots n}$ and $\mathbf{54}_{1 \ldots n}$ (see, for example, Grosshans et al, Int. J. Mass Spectrom. Ion Proc. 139, 1994, 169-189). Alternatively, a slow increase in static voltages followed by a sharp increase may be used to cause excitation.

Detection of the ions may be performed by measuring image currents in pairs or sets of ring electrodes $\mathbf{54}_{1 \ldots n}$ in the outer electrode 54. FIG. 5 shows a pair of symmetrical ring electrodes $\mathbf{54}_3$ and $\mathbf{54}_{n-2}$ being used for image current detection. With image current detection, the first stage of amplification 80 may be floated at the corresponding voltage, while later stages of differential amplification 82 are performed after capacitive decoupling 84 (see FIG. 5). Preferably, the detection electrodes $\mathbf{54}_3$ and $\mathbf{54}_{n-2}$ are kept at virtual ground (then for positive ions, the voltage applied to the inner electrode 52 is negative and the voltage applied to the outer electrode 54 is positive). Rather than just using a single pair of electrodes $\mathbf{54}_3$ and $\mathbf{54}_{n-2}$, multiple pairs may be used to detect higher harmonics of axial oscillations, thus increasing resolving power for a fixed duration of acquisition.

As an alternative to using image currents for detection, ions may be ejected axially to a secondary electron multiplier. In this case, ions could be trapped also using RF fields (e.g. applied to the inner electrode 52 or distributed along a series of ring electrodes). Additionally, the presence of a gas may be used to assist ion trapping, with pressures up to several mTorr. Networks 70 could be tuned to provide appropriate non-linearity of the axial field for this ejection, appropriate non-linearity being useful for improving ion ejection and thus for improvement of mass resolving power and mass accuracy.

FIGS. 3 and 4 show but merely one embodiment of a mass analyser 22 according to the present invention. FIGS. 8 to 11 show examples of other embodiments.

Figure 8:
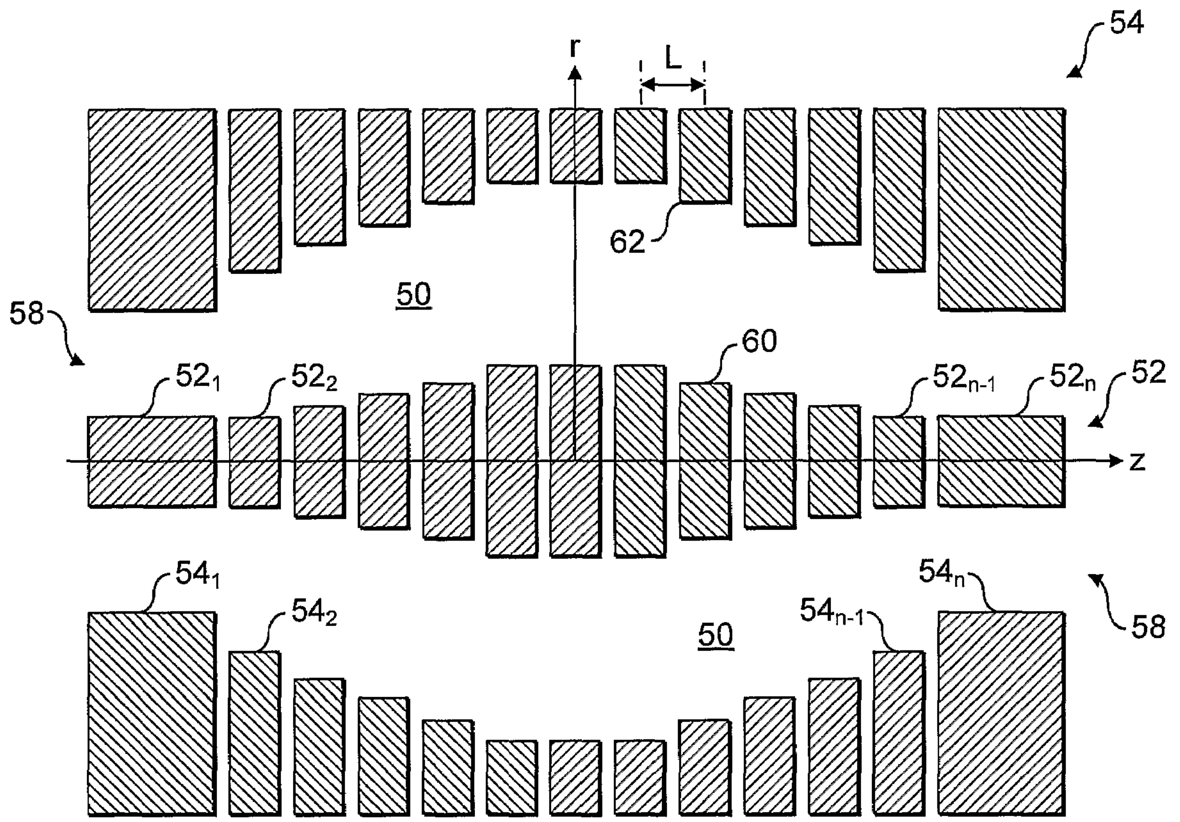
FIG. 8 is a sectional view of electrodes in an Orbitrap mass analyser according to a second embodiment of the present invention.

FIG. 8 shows the electrode structure of an Orbitrap mass analyser 22 according to a second embodiment of the present invention. In this embodiment, there are no end electrodes 68 such that the trapping volume 50 is open at either end 58. While the inner and outer electrodes 52 and 54 still comprise sets of ring electrodes $\mathbf{52}_{1 \ldots n}$ and $\mathbf{54}_{1 \ldots n}$, their outer and inner surfaces 60 and 62 respectively are no longer level to define cylindrical edges. Instead, the respective outer and inner surfaces 60 and 62 are staggered so as to follow approximately an equipotential of the desired hyper-logarithmic field.

Voltages may be applied to the ring electrodes $\mathbf{52}_{1 \ldots n}$ and $\mathbf{54}_{1 \ldots n}$ under computer control. As the ring electrodes $\mathbf{52}_{1 \ldots n}$ and $\mathbf{54}_{1 \ldots n}$ generally follow equipotentials, the individual voltages applied to each ring electrode $\mathbf{52}_{1 \ldots n}$ and $\mathbf{54}_{1 \ldots n}$ will be approximately equal. Thus, smaller voltages can be generated across the resistive networks 70 such that more accurate, lower voltage resistors may be used. Computer control is used to apply minor corrections to these near-identical voltages to obtain the optimum field. This arrangement also makes it easier to couple pre-amplifiers to multiple ring electrodes $\mathbf{52}_{1 \ldots n}$ and $\mathbf{54}_{1 \ldots n}$ because the pre-amplifiers may be floated at much lower voltages.

While the edges of the ring electrodes $\mathbf{52}_{1 \ldots n}$ and $\mathbf{54}_{1 \ldots n}$ that define the outer and inner surfaces 60 and 62 have flat tops that extend in the axial direction, the edges may be tilted to follow the equipotential or may be curved to follow the equipotential.

Figure 9:
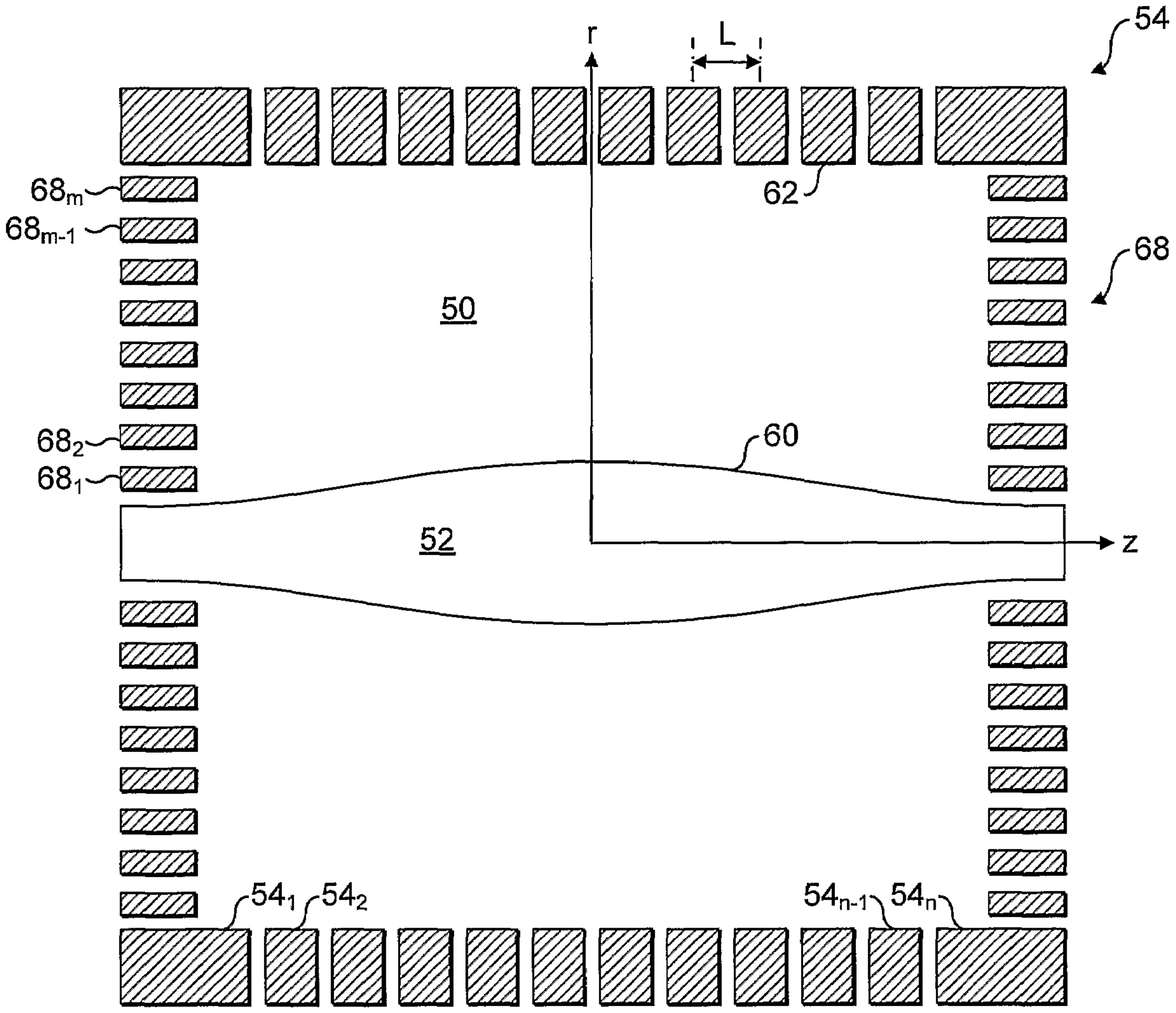
FIG. 9 is a sectional view of electrodes in an Orbitrap mass analyser according to a third embodiment of the present invention.

FIG. 9 shows a third embodiment of an electrode arrangement in a mass analyser 22 according to the present invention. The embodiment corresponds broadly to that of FIGS. 3 and 4, except the inner electrode 52 is now formed by a single-piece electrode akin to that of the prior art of FIG. 2. It may be advantageous to use a single piece inner electrode 52 in terms of manufacturing: it is very much easier to grind or turn this inner electrode 52 as a single piece. Provision of the many ring electrodes $\mathbf{54}_{1 \ldots n}$ and $\mathbf{68}_{1 \ldots m}$ for the outer electrode 54 and end electrodes 68 means that computer control may still be used to optimise the trapping field, including correcting any inaccuracies in the shape of the inner electrode 52.

Figure 10:
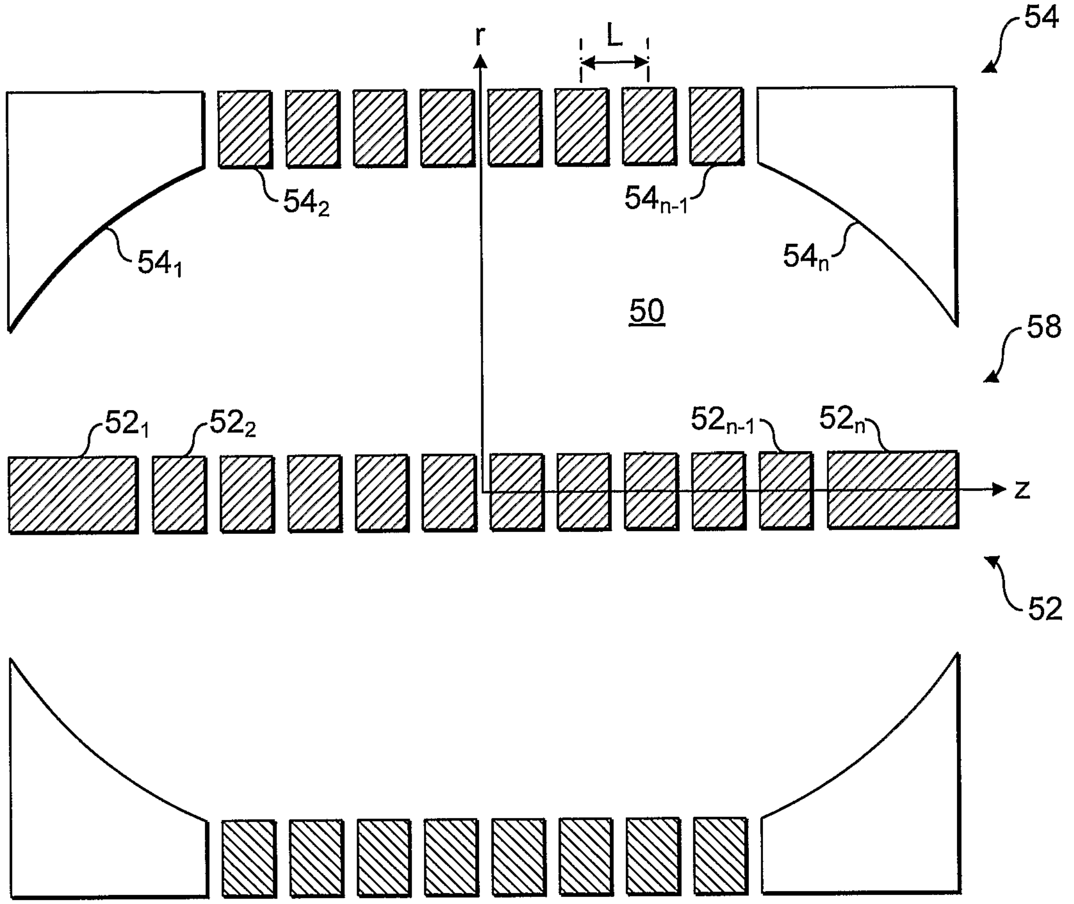
FIG. 10 is a sectional view of electrodes in an Orbitrap mass analyser according to a fourth embodiment of the present invention.
Figure 11:
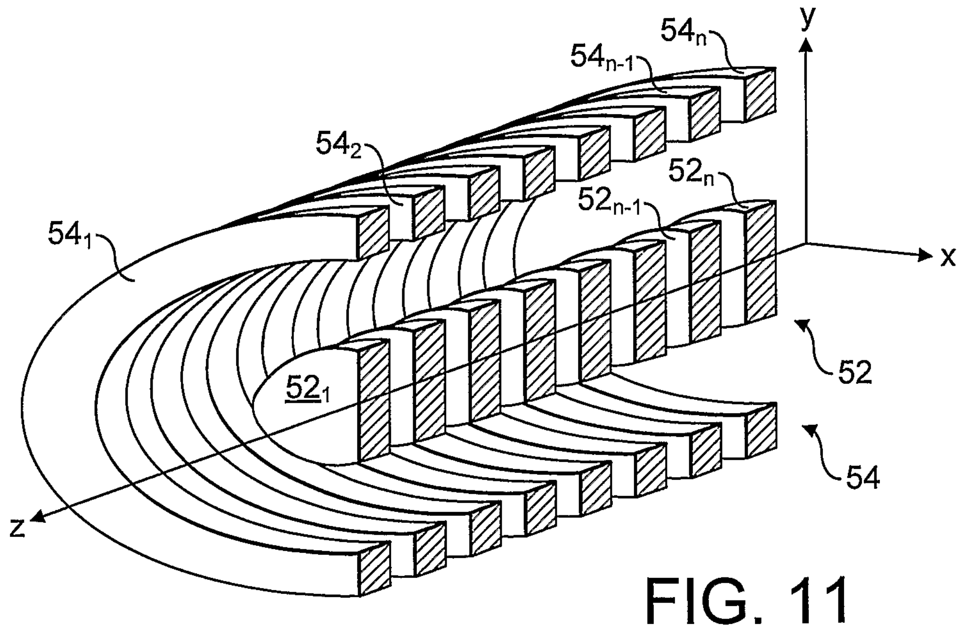
FIG. 11 is a cut-away perspective view of electrodes in an Orbitrap mass analyser according to a fifth embodiment of the present invention.

FIG. 10 shows a fourth embodiment of an electrode arrangement. The outer electrode 54 is modified over that of FIGS. 3 and 4. Specifically, the outer two ring electrodes at each end $\mathbf{54}_1$, $\mathbf{54}_2$, $\mathbf{54}_{n-1}$ and $\mathbf{54}_n$ of FIG. 3 have been replaced with single electrodes $\mathbf{54}_1$ and $\mathbf{54}_n$ that are shaped to define a tapering portion to the ends 58 of the trapping volume 50. This arrangement allows the end electrodes 68 to be omitted, along with the associated resistive networks $\mathbf{70}_5$ and $\mathbf{70}_6$. As the shaped electrodes $\mathbf{54}_1$ and $\mathbf{54}_n$ are located far away from where the ion packets orbit during detection, preferably at distances greater than twice the distance between inner and outer electrodes 52 and 54, the accuracy of their shapes may be much lower (typically, by an order of magnitude) than the accuracy required for ring electrode positioning or for the shape of single-piece electrodes as discussed with respect to the prior art.

The embodiments of FIGS. 3, 4 and 8 to 10 all employ inner and outer electrodes 52 and 54 that are divided into series of ring electrodes $\mathbf{54}_1$ and $\mathbf{54}_2$. The size of the ring electrodes $\mathbf{54}_1$ and $\mathbf{54}_2$ are chosen relative to the ion orbits. If the spatial period of the ring electrode structure is h, then ions should be confined to orbits at least two or three times h away from the electrodes 52 and 54. A separation of five times h or greater is preferred. Ideally, the number of ring electrodes $\mathbf{54}_1$ and $\mathbf{54}_2$ in either the inner or outer electrode 52 and 54 should be at least ten, and greater than 20 is better. Only an arbitrary number of electrodes are shown in the figures. Furthermore, while the figures show equal numbers of n ring electrodes $\mathbf{52}_{1 \ldots n}$ and $\mathbf{54}_{1 \ldots n}$ for both inner and outer electrodes 52 and 54, a different number of ring electrodes $\mathbf{52}_{1 \ldots a}$ and $\mathbf{54}_{1 \ldots b}$ may be chosen where a≠b. The length of the inner and outer electrodes 52 and 54 should be greater than the separation between inner and outer electrodes 52 and 54, with a length at least three times greater than the separation preferred. Typical examples of the outer diameter of the inner electrode 52 and the inner diameter of the outer electrode 54 are >8 mm and <50 mm respectively.

The thickness of the ring electrodes $\mathbf{52}_{1 \ldots n}$ and $\mathbf{54}_{1 \ldots n}$ may be 0.25 mm to 4 mm and they may be formed by electro-etching, laser cutting, wire-erosion, or electron-beam cutting. The ring electrodes $\mathbf{52}_{1 \ldots n}$, $\mathbf{54}_{1 \ldots n}$ and $\mathbf{68}_{1 \ldots m}$ may be formed from invar, stainless steel, nickel, titanium or any of the common metals used for electrodes. To ensure the correct spacing of the array of ring electrodes $\mathbf{52}_{1 \ldots n}$, $\mathbf{54}_{1 \ldots n}$ and $\mathbf{68}_{1 \ldots m}$, the ring electrodes may be assembled such that they are separated by precision-grinded dielectric spacers or balls. Ceramics, glass and quartz are examples of materials best suited for use as dielectrics. The ring electrodes $\mathbf{52}_{1 \ldots n}$, $\mathbf{54}_{1 \ldots n}$ and $\mathbf{68}_{1 \ldots m}$ and spacers may be mounted or press-fitted on precision-grinded ceramic rods or tubes. Also, the ring electrodes $\mathbf{52}_{1 \ldots n}$, $\mathbf{54}_{1 \ldots n}$ and $\mathbf{68}_{1 \ldots m}$ could be formed by depositing metal coatings on dielectric tubes or rods. Part of the electrode shaping could be done when electrodes and isolators are already assembled.

The above embodiments are merely a select few examples of how the present invention may be put into practice. It will be evident to the person skilled in the art that variation may be made to the above embodiments without departing from the scope of the present invention defined by the appended claims.

For example, all of the above embodiments have inner and outer electrodes 52 and 54 with generally circular cross-sections but this need not be the case. Other cross-sections such as elliptical or hyperbolic may be used, such as that shown in FIG. 11. The only constraint is that the outer electrode 54 should substantially surround the inner electrode 52 and that together the electrodes 52 and 54 should be able to approximate a potential distribution described by the formula:

$$V(x, y, z) = \frac{k}{2} \cdot z^2 + U(x, y)$$

where k is a constant (k>0 for positive ions) and $$\frac{\partial^2 U}{\partial x^2} + \frac{\partial^2 U}{\partial y^2} = -k.$$

For example, $$U(x, y) = -\frac{k}{2}[a \cdot x^2 + (1-a) \cdot y^2] + \left[A \cdot r^m + \frac{B}{r^m}\right]\cos\left\{n \cdot \cos^{-1}\left(\frac{x}{r}\right) + a\right\} + b \cdot \ln\left(\frac{r}{D}\right) + E \cdot \exp(F \cdot x)\cos(F \cdot y + \beta) + G\exp(H \cdot y)\cos(H \cdot x + \gamma)$$

where $r=\sqrt{(x^2+y^2)}$, and α, β, γ, a, b, A, B, D, E, F, G, H are arbitrary constants (D>0), and n is an integer.

The trapping volume 50 could be gas-filled up to pressures $10^{-10} \ldots 10^{-8}$ mbar to facilitate collision-induced dissociation (CID) for MS/MS experiments. Subsequent detection of fragments will require excitation of axial oscillations using frequency sweep or other waveforms coupled to at least some of inner and outer ring electrodes $\mathbf{52}_{1 \ldots n}$ and $\mathbf{54}_{1 \ldots n}$ (as known in the art, see e.g. P. B. Grosshans, R. Chen, P. A. Limbach, A. G. Marshall, Int. J. Mass Spectrom. Ion Proc. 139, 1994, 169-189).

Also, it is possible to operate such a mass analyser 22 at much higher pressures, up to few mTorr, and eject ions to a secondary electron multiplier using resonance ejection or mass-selective instability, preferably in a field that is shaped to provide an appropriate non-linearity. In this case, ions are collisionally cooled and their trapping is provided not by the balance of electrostatic and centrifugal force, but by a quasi-potential formed by a trapping high-voltage RF coupled to inner and outer ring electrodes $\mathbf{52}_{1 \ldots n}$ and $\mathbf{54}_{1 \ldots n}$. In this case, potential distributions above remain valid but they are modulated with the frequency and phase of the RF. Also, the end electrodes 68 preferably operate without RF if the trapping volume 50 is particularly elongate. Otherwise, a radius-dependent share of the RF should be applied to each of the end electrodes 68. All known MS/MS capabilities of gas-filled RF ion traps could be also implemented in such a trap.

In all embodiments, the gaps between the ring electrodes $\mathbf{52}_{1 \ldots n}$, $\mathbf{54}_{1 \ldots n}$ or $\mathbf{68}_{1 \ldots m}$ may also be used to facilitate fragmentation for MS/MS experiments. For example, a laser beam can be directed through a gap to enable photon induced dissociation (PID). One or more gaps may also be used for ejection of ions onwards to further storage or analysis.

Small controlled perturbations of voltages on electrodes could be used for dosed introduction of small non-linear fields as described in co-pending patent application GB0511375.8.

It should be noted that the term "trapping" in this invention is interpreted in a broad sense, i.e. as a limitation of ion motion along at least one direction. Therefore, it includes not only trapping in all three directions (like in the Orbitrap mass analyser) but also trapping wherein ions spread along another direction, as typical in multi-reflection systems of e.g. GB-A-2,080,021. Therefore described methods of tuning and operating an electrostatic trap are applicable not only to the embodiments above but also to all types of multi-reflection devices containing substantially electrostatic fields.

What is claimed is:

1. A method of analysing ions trapped in a trapping volume of a mass spectrometer, comprising:

(a) applying voltages to a plurality of electrodes thereby producing a trapping field to trap a test set of ions in the trapping volume such that the trapped ions adopt oscillatory motion;

(b) collecting one or more mass spectra from the trapped ions and measuring a plurality of features from peaks with different intensities from the one or more mass spectra to derive one or more characterisitics;

(c) comparing the one or more measured characterisitics to one or more tolerance values;

and (d) if the one or more measured characteristics meets the one or more tolerance values, applying the voltages to the plurality of electrodes to trap a set of analyte ions in the trapping volume such that the trapped ions adopt oscillatory motion; and (e) collecting one or more mass spectra from the analyte ions trapped in the trapping volume;

or (f) if the one or more measured characteristics do not meet the one or more tolerance values, using the one or more measured characteristics to improve the voltages to be applied to the plurality of electrodes; and (g) repeating steps (a) through (c).

2. The method of claim 1, wherein step (c) comprises comparing one or more corresponding measured characteristics of the peaks with different intensities with one or more tolerance values to ensure the spread between the measured characteristics is within a tolerated range.

3. The method of claim 1, comprising measuring the features of two peaks whose intensities differ by a factor of more than: 2, 5, 10, 20, 100, or 500.

4. The method of claim 1, wherein step (b) comprises measuring the isochronicity of the features.

5. The method of claim 1, wherein step (b) comprises measuring two or more of: peak position, peak amplitude, peak width, peak shape, peak resolution, signal to noise, mass accuracy or drift.

6. The method of claim 4, wherein the one or more characteristics relate to the fidelity of the one or more mass spectra.

7. The method of claim 1, comprising performing step (f) to improve the voltages according to an evolutionary algorithm.

8. The method of claim 1, wherein at least one of the plurality of electrodes comprises an array of plate electrodes, the method comprising applying the voltages to the array of plate electrodes.

9. The method of claim 8, comprising improving the voltage to be applied to each of the plate electrodes.

10. The method of claim 8, comprising improving the voltages so as to produce a trapping field that improves maintenance of the coherence of the oscillating trapped ions.

11. The method of claim 10, wherein the mass spectrum is collected over a detection time and the method comprises improving the voltages so that any drift in phase associated with loss in coherence is less than $2\pi$ during the detection time.

12. The method of claim 10, wherein the trapping volume has a longitudinal axis and the method comprises optimising maintenance of the coherence of the axial component of oscillation of the trapped ions.

13. The method of claim 12, wherein the trapping volume is defined between an inner electrode and an outer electrode that substantially surrounds the inner electrode, and the method comprises applying the voltages to the inner and outer electrodes.

14. The method of claim 13, wherein applying the voltages to the inner and outer electrodes produces a hyper-logarithmic trapping field.

15. The method of claim 14, wherein the inner electrode and/or outer electrode is shaped such that its surface that borders the trapping volume follows an equipotential of the hyper-logarithmic field, and the method comprises applying a voltage to the so shaped inner or outer electrode to produce a desired equipotential.

16. The method of claim 14, wherein the inner electrode and/or the outer electrode comprises an array of plate electrodes extending in spaced arrangement along a longitudinal axis of the trapping volume, the method comprising applying the voltages to the array of plate electrodes.

17. The method of claim 16, wherein volume is trapped such that the surface at least approximately follows an equipotential of the hyper-logarithmic field, and the method comprises applying a common voltage to the plate electrodes and using the characteristic to improve the voltage to be applied to each plate electrode.

18. The method of claim 16, wherein the edges of the plate electrodes define the surface of the inner or outer electrode that borders the trapping volume, the method comprising applying the voltages to the plate electrodes to match the potential of the desired hyper-logarithmic field where it meets its edge.

19. The method of claim 16, wherein the hyper-logarithmic trapping field is symmetrical about the center of the trapping volume.

20. The method of claim 19, wherein the array of plate electrodes is symmetric about the center of the trapping volume, and the method comprises applying a common voltage to a symmetrically disposed pair of plate electrodes.

21. The method of claim 20, comprising improving the common voltage applied to each ring electrode to produce an improved voltage for each symmetrically disposed pair of plate electrodes.

* * * * *